Patented July 22, 1941

2,250,201

UNITED STATES PATENT OFFICE 2,250,201

METHOD OF PREPARING STABLE CELLULOSE ESTERS

Carl J. Malm, Rochester, N. Y., and Guy A. Kirton, Kingsport, Tenn., assignors to Eastman Kodak Company, Rochester, N. Y., a corporation of New Jersey No Drawing. Application February 3, 1939, Serial No. 254,492

5 Claims. (Cl. 260—225)

This invention relates to the stabilization of cellulose esters, having a high propionyl or butyryl content, by slowly converting the anhydride in the reaction mixture in which it is dissolved to the corresponding acid, neutralizing the sulfuric acid or other catalyst used and subsequently boiling in water.

The manufacture of cellulose propionate, cellulose butyrate, or cellulose acetate propionate or acetate butyrate, having a high propionyl or butyryl content, has been referred to in the prior art. When, however, sulfuric acid has been used as the catalyst, a product of poor stability has invariably resulted, due to its presence in either physically or chemically combined form. Cellulose esters, having a high propionyl or butyryl content, are of such a hydrophobic nature that washing lacks effectiveness in the removal of the sulfuric acid.

One object of our invention is to provide a method of treating such a cellulose ester comprising a combination of steps to assure a stable product. Another object of our invention is to provide a method of removing the combined sulfuric acid from a cellulose ester containing a high proportion of propionyl and/or butyryl. Other objects of our invention will appear herein.

We have found that, if, after a high propionyl or butyryl cellulose ester has been prepared, the residual anhydride is slowly converted to the corresponding acid, the sulfuric acid in the dope is neutralized and the cellulose ester is separated from the reaction materials and is boiled, a cellulose ester of excellent stability is obtained.

The slow conversion of the anhydride in the spent esterification mixture in which the cellulose ester is dissolved has the effect of removing the combined sulfuric acid. This conversion may be carried out either by slowly adding the necessary amount of water while thoroughly mixing it into the mass or by slowly adding the water in admixture with a lower fatty acid, such as acetic acid. The rate at which the water is added depends to some extent upon the mass of reaction mixture which is present. For instance, for a two-ton mass, it is desirable that not more than 10 pounds of water per minute be added, accompanied by rapid mixing. If the mass is one ton it is desirable to add not more than approximately 5 pounds of water per minute. If the amount of anhydride is small, additional anhydride might be incorporated in the mass prior to adding the water in order to make the conversion extend over an effective length of time. It is desired that the killing of the anhydride be spread over at least 10 minutes, particularly if only one conversion of anhydride to acid is performed. The conversion of anhydride to acid, which is exothermic, should be at a rate which will raise the temperature of the mass to at least 100° F. but not more than approximately 120° F.

A plurality of conversions of anhydride to acid is preferable. For instance, after all the anhydride present has been converted to acid, sufficient anhydride, to bring the mixture back to the anhydrous side, may again be added and further water is then slowly added thereto. The amount of water necessary to convert the anhydride can be calculated or instead of this, the mixture can be tested at intervals during the addition of the water. The rate of addition of the water may be governed by the size of the reaction mass. For instance, with a ½-ton mass, not more than 2–3 pounds of water per minute should be added. During the addition of the water, the mass should be rapidly stirred to assure thorough and immediate mixing of the water and the mass. Instead of adding water, aqueous acetic acid may be added and the rate at which the addition takes place depends on the concentration of the aqueous acid, being governed by the amount of water which is being provided to the mass per unit of time. The temperature of the reaction mass influences the efficiency of the removal of combined sulfuric acid. We have found it desirable to have the temperature reach at least 100° F. at the time all the water has been added. A maximum temperature of 110 to 120° F. however is preferred.

By slowly converting the anhydride to acid, combined sulfuric acid is freed from the cellulose ester. If the product is then precipitated, washed and dried, even though the combined sulfuric acid has been freed, an unstable product is obtained. Even though the sulfuric acid present is in uncombined form, it is practically impossible to wash it all out of the precipitate on account of the hydrophobic nature of the cellulose ester. We have found that in order to get a stable product after the freeing of the combined sulfuric acid, it is necessary to neutralize that acid which is present in the dope prior to the precipitation step. This may be accomplished by adding a chemically equivalent amount of any neutralizing agent which will form a sulfate soluble in water and in aqueous acetic acid with the sulfuric acid, such as sodium carbonate, sodium acetate, magnesium carbonate or the like. Other neutralizing materials, which may be employed but have obvious disadvantages, are sodium hydroxide which, unless used in very dilute solution, might cause a slight amount of hydrolysis, or calcium acetate, which forms a sulfate which is not as readily water soluble as that of the alkali metals. The product, after this treatment, is then washed and is boiled, preferably in distilled water. The boiling may be, for instance, for 12 hours, although the time of treatment will, of course, vary with the ester being treated. The time of boiling is that sufficient to obtain a stable product. Often less than 12 hours such as even 5 or 6 hours may be satisfactory but treatment for 12 hours is ordinarily sufficient for completing the stabilization of esters of high propionyl or butyryl content. After boiling in purified water such as distilled water or filtered water, a product is obtained which has an excellent stability.

If a partially hydrolyzed cellulose ester is desired, the hydrolysis step is performed after the conversion of the anhydride to acid, whereby the combined sulfuric acid is removed, before the sulfuric acid present has been neutralized.

The following example illustrates the preparation of a cellulose ester and its stabilization in accordance with our invention:

500 pounds of refined cotton linters were soaked in a mixture of 770 pounds of glacial acetic acid and 230 pounds of butyric acid for 4 hours at 120° F. 750 pounds of butyric acid was added and the mass was cooled to 50° F. A mixture of 250 pounds of butyric acid and 6600 cc. of sulfuric acid was cooled to 50° F. and added to the mass which was then maintained at 50° F. for one hour. 2000 pounds of refrigerated butyric anhydride was then added thus inducing esterification of the cellulose. The reaction was allowed to continue for 3½ hours, the maximum temperature being 80–85° F. 70 pounds of water was added over a period of 10 minutes, accompanied by thorough mixing with the reaction mixture so that the temperature reached 100° F. but did not exceed approximately 120° F. Sufficient acetic anhydride was then added to again render the mass anhydrous. Further water was slowly added to convert the anhydride to acid at a rate that assured a temperature of at least 100° F. but not exceeding approximately 120° F. If desired the ester may be hydrolyzed by adding further water or aqueous acetic acid so that the bath contains about 10% of water and maintaining the temperature at 100° F. for the required time.

After the conversion of the anhydride with or without subsequent hydrolysis, the catalyst present was neutralized with magnesium carbonate. The cellulose ester was then separated out by precipitating the mass containing it in dilute acetic-butyric acid of approximately 30–45% strength. The cellulose acetate butyrate formed was separated, washed and boiled for 12 hours in distilled water. After washing, the mass was pressed to remove some of the water and the ester was then dried in warm, dry air at a moderate temperature. The fully esterified product has a melting point of 190° C. but does not char until it has been heated to 300° C. indicating an exceptionally good stability.

We claim:

1. The method of stabilizing a cellulose ester containing at least 25% of fatty acid groups of 3–4 carbon atoms which is in solution in the reaction mixture in which it was prepared, in which a sulfuric acid catalyst was employed, which essentially consists of adding slowly over a period of at least ten minutes sufficient water thereto to convert all the anhydride present to acid and maintaining at 100–120° F. during the addition of the water, adding lower fatty acid anhydride thereto and then adding slowly over a period of at least ten minutes sufficient water to convert all the added anhydride to acid and maintaining at 100–120° F. during the addition of the water, subsequently neutralizing all of the sulfuric acid with approximately a chemically equivalent amount of a neutralizing agent which gives a sulfate soluble in both water and aqueous acetic acid and after precipitating and washing the ester, boiling it in purified water for a sufficient time to assure a highly stable product.

2. The method of stabilizing a cellulose acetate butyrate containing at least 25% of butyryl which ester is in solution in the reaction mixture in which it was prepared, in which a sulfuric acid catalyst was employed, which essentially consists of adding slowly over a period of at least ten minutes sufficient water thereto to convert all the anhydride present to acid and maintaining at 100–120° F. during the addition of the water, adding lower fatty acid anhydride thereto and then adding slowly over a period of at least ten minutes sufficient water to convert all the added anhydride to acid and maintaining at 100–120° F. during the addition of the water, subsequently neutralizing all of the sulfuric acid with approximately a chemically equivalent amount of a neutralizing agent which gives a sulfate soluble in both water and aqueous acetic acid and after precipitating and washing the ester, boiling it in purified water for a sufficient time to assure a highly stable product.

3. The method of stabilizing a cellulose butyrate substantially all the acyl of which is butyryl which ester is in solution in the reaction mixture in which it was prepared, in which a sulfuric acid catalyst was employed, which essentially consists of adding slowly over a period of at least ten minutes sufficient water thereto to convert all the anhydride present to acid and maintaining at 100–120° F. during the addition of the water, adding lower fatty acid anhydride thereto and then adding slowly over a period of at least ten minutes sufficient water to convert all the added anhydride to acid and maintaining at 100–120° F. during the addition of the water, subsequently neutralizing all of the sulfuric acid with approximately a chemically equivalent amount of a neutralizing agent which gives a sulfate soluble in both water and aqueous acetic acid and after precipitating and washing the ester, boiling it in purified water for a sufficient time to assure a highly stable product.

4. The method of stabilizing a cellulose ester containing at least 25% of fatty acid groups of 3–4 carbon atoms which is in solution in the reaction mixture in which it was prepared, in which a sulfuric acid catalyst was employed, which essentially consists of adding slowly over a period of at least ten minutes sufficient water thereto to convert all the anhydride present to acid and maintaining at 100–120° F. during the addition of the water, adding lower fatty acid anhydride thereto and then adding slowly over a period of at least ten minutes sufficient water to convert all the added anhydride to acid and maintaining at 100–120° F. during the addition of the water, subsequently neutralizing all of the sulfuric acid with approximately a chemically equivalent amount of magnesium carbonate and after precipitating and washing the ester, boiling it in purified water for a sufficient time to assure a high stable product.

5. The method of stabilizing a cellulose ester containing at least 25% of fatty acid groups of 3-4 carbon atoms which is in solution in the reaction mixture in which it was prepared, in which a sulfuric acid catalyst was employed, which essentially consists of adding slowly over a period of at least ten minutes sufficient water thereto to convert all the anhydride present to acid and maintaining at 100-120° F. during the addition of the water, adding lower fatty acid anhydride thereto and then adding slowly over a period of at least ten minutes sufficient water to convert all the added anhydride to acid and maintaining at 100-120° F. during the addition of the water, subsequently neutralizing all of the sulfuric acid with approximately a chemically equivalent amount of a neutralizing agent which gives a sulfate soluble in both water and aqueous acetic acid and after precipitating and washing the ester, boiling it in distilled water for a sufficient time to assure a highly stable product.

CARL J. MALM.
GUY A. KIRTON.